United States Patent [19]
Austin et al.

[11] Patent Number: 5,781,711
[45] Date of Patent: Jul. 14, 1998

[54] DOCUMENT SERVER FOR PROCESSING A DISTRIBUTION JOB IN A DOCUMENT PROCESSING SYSTEM

[75] Inventors: Paul R. Austin, Webster; Wendell L. Kibler, Ontario; Christopher Kulbida, Fairport; Steven E. Haehn, Rochester; Keith G. Bunker, Hilton, all of N.Y.

[73] Assignee: Xerox Corporation, Stamford, Conn.

[21] Appl. No.: 909,604

[22] Filed: Aug. 12, 1997

Related U.S. Application Data

[62] Division of Ser. No. 563,808, Nov. 28, 1995, Pat. No. 5,689,625.

[51] Int. Cl.[6] ........................................ G06F 15/00
[52] U.S. Cl. .............................. 395/114; 395/117
[58] Field of Search .......................... 395/101, 102, 395/106, 109, 114, 112, 113, 117, 200.3, 200.31, 200.32, 200.33, 200.76, 200.79, 200.8, 728, 800.15, 800.28; 345/501, 502, 335; 382/175, 277, 284, 303, 304, 133; 364/133, 231.8, 948.34, 949.91, 949.5

[56] References Cited

U.S. PATENT DOCUMENTS

| | | | |
|---|---|---|---|
| 4,273,439 | 6/1981 | Markham et al. | 399/87 |
| 5,025,395 | 6/1991 | Nose et al. | 345/335 |
| 5,077,795 | 12/1991 | Rourke et al. | 380/55 |
| 5,113,494 | 5/1992 | Menendez et al. | 345/502 |
| 5,164,842 | 11/1992 | Gauronski et al. | 358/401 |
| 5,170,340 | 12/1992 | Precipe et al. | 364/148 |
| 5,175,679 | 12/1992 | Allen et al. | 364/148 |
| 5,369,778 | 11/1994 | San Soucie et al. | 395/800 |
| 5,421,015 | 5/1995 | Khoyi et al. | 395/667 |
| 5,467,434 | 11/1995 | Hower, Jr. et al. | 395/114 |
| 5,513,126 | 4/1996 | Harkins et al. | 358/402 |
| 5,528,375 | 6/1996 | Weyeng et al. | 358/296 |
| 5,611,050 | 3/1997 | Theimer et al. | 395/200.32 |
| 5,621,734 | 4/1997 | Mann et al. | 395/200.57 |
| 5,689,625 | 11/1997 | Austin et al. | 395/114 |

*Primary Examiner*—David K. Moore
*Assistant Examiner*—Gabriel I. Garcia
*Attorney, Agent, or Firm*—Gary B. Cohen

[57] ABSTRACT

A document server is provided for processing a distribution job in a document processing system. The document processing system includes a document manager, communicating with first and second virtual services, for coordinating the storing or processing of first and second copies of an image data set at the first and second virtual services, respectively. The document processing system further includes a distribution agent, communicating with the document manager, for receiving a first job ticket, including attributes for controlling the storing or processing of the first copy of the image data set at the first virtual service and a second job ticket for controlling the storing or processing of the second copy of the image data set at the second virtual service. The document manager and the distribution agent function cooperatively to provide the document server with the capability to halt the processing of the first and second copies of the image data set in order for altering attributes of the first and second job tickets, and to determine the status of the processing of the first and second copies of the image data set. Moreover, the distribution agent can provide values for attributes of the first and second job tickets when a user does not program those values in the first and second job tickets.

19 Claims, 12 Drawing Sheets

DOCUMENT SERVER FOR PROCESSING A DISTRIBUTION JOB IN A DOCUMENT PROCESSING SYSTEM

This application is a division of application Ser. No. 08/563,808, filed Nov. 28, 1995 now U.S. Pat. No. 5,689,625. Cross reference is made to co-pending Patent application Ser. No. 08/(Attorney's Docket No. D/95479) entitled Document Server for Processing A Distribution Job In A Document Processing System filed by the same Applicants as the present application on Nov. 28, 1995.

BACKGROUND OF THE INVENTION

1. Field of the Invention

The present invention relates generally to a system for managing the distribution of job copies in an image processing system and, more particularly, to a print server in which a distribution agent and document manager function cooperatively to optimize the delivery of the job copies among a plurality of virtual services. The print server further permits a wide variety of operations to be performed on the distribution job with a minimum amount of resources.

2. Description of Related Art

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340 Patentees: Prokop et al. Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955 Patentees: Shope et al. Issued: Sept. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071 Patentee: Jones Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107 Patentees: Naito et al. Issued: Apr. 11, 1989

U.S. Pat. No. 5,021,892 Patentees: Kita et al. Issued: Jun. 4, 1991

U.S. Pat. No. 5,175,633 Patentees: Saito et al. Issued: Dec. 29, 1992

U.S. Pat. No. 5,223,948 Patentees: Sakurai et al. Issued: Jun. 29, 1993

U.S. Pat. No. 5,276,799 Patentee: Rivshin Jan. 4, 1994

U.S. Pat. No. 5,307,458 Patentees: Freiburg et al. Issued: Apr. 26, 1994

Programming a job is often achieved with a "job ticket". For many printing systems, the job ticket is provided in the form of one or more programmable dialogs, each programmable dialog including values which are selected with a user interface, such as the user interface found in a DocuTech® printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

Since the programming for a job can be relatively complex, it is often desirable to provide a plurality of job tickets, corresponding with a plurality of frames. In practice, each dialog relates to the programming of a set of job attributes, such as stock characteristics. The following patent relates to a technique in which multiple job tickets may be used to program a job:

U.S. Pat. No. 5,079,723 Patentees: Herceg et al. Issued: Jan. 7, 1992

U.S. Pat. No. 5,079,723 discloses a touch dialog user interface for programming a reproduction machine through use of a touch control CRT screen with a display for providing a message area, user interface state selections, and plural tapped file folders. Each file folder, when opened, in turn, displays a smaller card file of tabbed cards with an adjacent work area. Each card in the card file, when opened, provides a display of icons representing first level machine programming selections for touch selection. Each icon, when touched, displays further icons representing second level programming selections in the work area for touch selection.

At least some of the basic concepts of U.S. Pat. No. 5,079,723 have been incorporated into the DocuTech® Printing System. The following patents, among others, relate to the multiple job ticket scheme of the DocuTech Printing System.

U.S. Pat. No. 5,260,805 Patentee: Barrett Issued: Nov. 9, 1993

U.S. Pat. No. 5,398,289 Patentees: Rourke et al. Issued: Mar. 14, 1995

U.S. Pat. No. 5,260,805 discloses an electronic printing system with a touch screen for programming print jobs using job tickets displayed on the screen. The job tickets have various job programming choices together with scaled representations of a print image superimposed on selected print media, and a control for comparing the size of the print image, as originally oriented with the maximum image size. A full message is displayed on the screen, in the event that the print image size exceeds the system maximum image size, even though the print image as displayed fits into the print media.

U.S. Pat. No. 5,398,289 discloses a technique for printing a signature job, i.e., a job resulting in a plurality of sheets being imaged on signature print media sheets, in a selected order for creating a booklet. A plurality of job tickets are employed to program the signature job. In one aspect of the technique, lay-out work for the signatures to be produced is performed with a job ticket in which a gutter and margins are programmably set for each pair of electronic sheets on one side of an electronic signature sheet.

Certain versions of the DocuTech® printing system can be coupled operatively with one or more network clients by way of a DocuTech Network Server. A multiple job ticket scheme adapted for use in a Network DocuTech® Printing System is disclosed in the following patent:

U.S. Pat. No. 5,450,571 Applicants: Rosekrans et al. Issued: Sep. 12, 1995

The Network Printing System of the '571 patent includes a print server having a plurality of print queues mapped with one or more mask files. Each of the queues communicates with one or more workstations and upon selecting one of the print queues with a selected workstation a mask file associated with the selected print queue is communicated to a job ticket processing circuit. An interclient job ticket, which represents all of the attributes of all of the printers associated with the print queues is combined with the associated mask file to obtain a user interface dialog job ticket, which user interface dialog job ticket is displayed at the selected workstation. The user interface dialog job ticket displays the attributes of the printer associated with the selected print queue.

The following patent application relates to the development of a composite job ticket:

U.S. patent application Ser. No. 08/315,273 Filed Sep. 29, 1994 Applicants: Salgado et al.

U.S. patent application Ser. No. 08/315,273 discloses a method for creating a composite job ticket with multiple compound segments. In practice a plurality of job copies are programmed with an integrated job ticket so that even a large number of job ticket sets can be managed conveniently as one set.

Typically, a composite job ticket relates to a single image data set, copies of which are intended for delivery to multiple destinations. In one sense, such a job may be thought of as a "distribution job" since the job, with its attendant image data, is being distributed to a plurality of recipients. Servers suitable for coordinating the storage and/or processing of a nondistribution job (i.e. a job with a single set of image data intended for delivery to one destination) follow:

U.S. Pat. No. 5,113,494 Patentees: Menendez et al. Issued: May 12, 1992

U.S. Pat. No. 5,179,637 Patentee: Nardozzi Issued: Jan. 12, 1993

U.S. Pat. No. 5,220,674 Patentees: Morgan et al. Issued: Jun. 15, 1993

U.S. Pat. No. 5,113,494 discloses an arrangement in which a plurality of nodes communicate with one another by way of a local area network communication line. In one example, a hardcopy of a job could be processed at a scan node while an electronic copy of the same job could be processed at a print node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. The server includes various subsystems, e.g. a server job controller for managing multiple job requests transmitted from the clients to the server. The '674 further contemplates a system in which a wide range of services can be provided by the server for jobs transmitted thereto from one of the clients. For example, the server can determine the processing status of a job in the server or at one the printers. Moreover, the position of a job in one of the printer queues can be altered or the processing of a job can be paused so that attribute changes can be made.

The pertinent portions of each of the above-discussed references is incorporated herein by reference.

There are servers that use a single document manager based on the protocol of DPA ISO 10175 which streamline document processing and allow for minimization of UMC. Examples of such servers may be found in products made available by Xerox Corporation under the "Document Centre" product name. Document Centre products, however, are not believed to currently possess the functionality necessary for both executing and managing a distribution job, i.e. a job calling for multiple copies of the job to be delivered to and/or outputted at multiple destinations. It would be desirable to provide a system which could be readily coupled with a document manager for providing such functionality.

SUMMARY OF THE INVENTION

In accordance with one aspect of the present invention there is provided a document server, including a client, for processing a distribution job in a document processing system. The distribution job includes an image data set as well as a first job ticket and a second job ticket, the first and second job tickets including first and second sets of attributes, respectively, each of the first and second attribute sets describing a manner in which first and second copies of the image data are to be stored in or processed by the document processing system. The document processing system includes a first virtual service for storing or processing the first copy of the image data set in accordance with the first attribute set and a second virtual service for storing or processing the second copy of the image data set in accordance with the second attribute set. The document server includes: a document manager, communicating with the first and second virtual services, for coordinating the storing or processing of the first and second job copies in the first and second virtual services; a distribution agent, communicating with said document manager, for receiving the first and second job tickets of the distribution job as a single package, said distribution agent transmitting a copy of the first job ticket of the single package to said document manager so that said document manager facilitates routing of both the first copy of the image data set and the copy of the first job ticket to the first virtual service, and said distribution agent transmitting a copy of the second job ticket of the single package to said document manager so that said document manager facilitates routing of both the second copy of the image data set and the copy of the second job ticket to the second virtual service; and said distribution agent receiving a distribution job alteration request after the copies of the first and second job tickets have been transmitted to said document manager, the distribution job alteration request including information indicating an alteration to be made in one or more of the attributes of each of the first and second attribute sets, said distribution agent, in response to receiving the distribution job alteration request, transmitting a task halting request to said document manager, said document manager, in response to receiving the task halting signal, causing any ongoing activities, relative to the first and second copies of the image data set, to be halted.

In accordance with another aspect of the present invention there is provided a document server, including a client, for processing a distribution job in a document processing system. The distribution job includes an image data set as well as a first job ticket and a second job ticket, the first and second job tickets including first and second sets of attributes, respectively, each of the first and second attribute sets describing a manner in which first and second copies of the image data set are to be stored in or processed by the document processing system. The document processing system includes a first virtual service for storing or processing a first copy of the image data set in accordance with the first attribute set and a second virtual service for storing or processing a second copy of the image data set in accordance with the second attribute set. The document server includes: a document manager, communicating with the first and second virtual services, for coordinating the storing or processing of the first and second copies of the image data set in the first and second virtual services; a distribution agent, communicating with said document manager, for receiving the first and second job tickets of the distribution job as a single package, said distribution agent transmitting a copy of the first job ticket of the single package to said document manager so that said document manager facilitates routing of both the first copy of the image data set and the copy of the first job ticket to the first virtual service, and said distribution agent transmitting a copy of the second job ticket of the single package to said document manager so that said document manager facilitates routing of both the second copy of the image data set and the copy of the second job ticket to the second virtual service; and said distribution agent receiving a first distribution job status request after the copies of the first and second job tickets have been transmitted to said document manager, said distribution agent transmitting a second distribution job status request, to said document manager, for directing said document manager to determine an extent to which each of the first copy of the image data set and the second copy of the image data set has been processed by the document server, said document manager, in response to receiving the second distribution job status request, causing the extent to which each of the first copy of the image data set and the second copy of the image data set has been processed by the document server to be determined.

In accordance with yet another aspect of the present invention there is provided a document server, including a client, for processing a distribution job in a document processing system. The document server is disposed on a network serving a plurality of network users, the distribution job including an image data set as well as a first job ticket and a second job ticket, the first and second job tickets including first and second sets of attributes, selected ones of the attributes of the first and second attribute sets being corresponded with client programmed values with each client programmed value describing a manner in which first and second copies of the image data set are to be stored in or processed by the document processing system—wherein at least one attribute in each of the first and second attribute sets is not provided with a client programmed value. The document processing system includes a first virtual service for storing or processing a first copy of the image data set in accordance with the first attribute set and a second virtual service for storing or processing a second copy of the image data set in accordance with the second attribute set. The document server includes: a document manager, communicating with the first and second virtual services, for coordinating the storing or processing of the first and second job copies in the first and second virtual services; a distribution agent, communicating with said document manager, for receiving the first and second job tickets of the distribution job as a single package, said distribution agent transmitting a copy of the first job ticket of the single package to said document manager so that said document manager facilitates routing of both the first copy of the image data set and the copy of the first job ticket to the first virtual service, and said distribution agent transmitting a copy of the second job ticket of the single package to said document manager so that said document manager facilitates routing of both the second copy of the image data set and the copy of the second job ticket to the second virtual service; a database, communicating with said document agent, for storing a plurality of user profiles with each user profile including a network attribute set for each of the network users, each attribute in each network user attribute set having a corresponding value indicating one of the network user's preferences with respect to a manner in which a set of image data is to be stored or processed by the document processing system; and prior to transmitting copies of the first and second job tickets from said document agent to said document manager, said distribution agent automatically designating, by reference to the database, a value to be provided for those attributes lacking a client programmed value.

These and other aspects of the invention will become apparent from the following description, the description being used to illustrate a preferred embodiment of the invention when read in conjunction with the accompanying drawings.

DETAILED DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
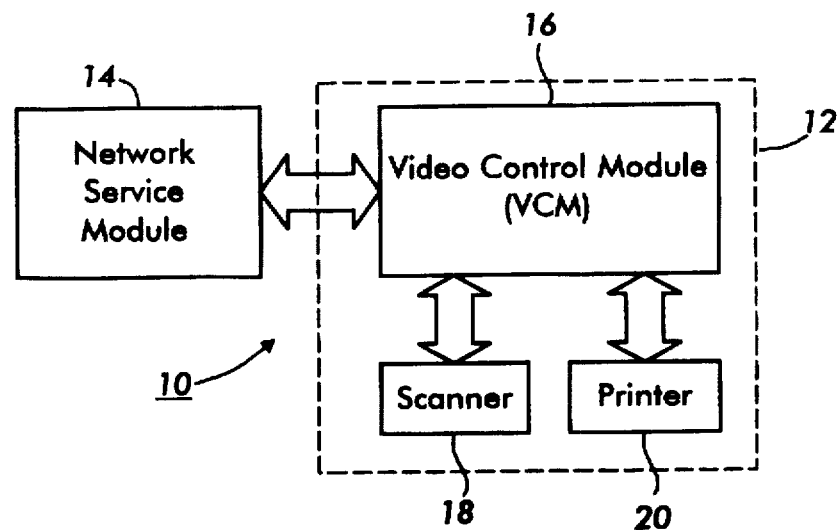
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
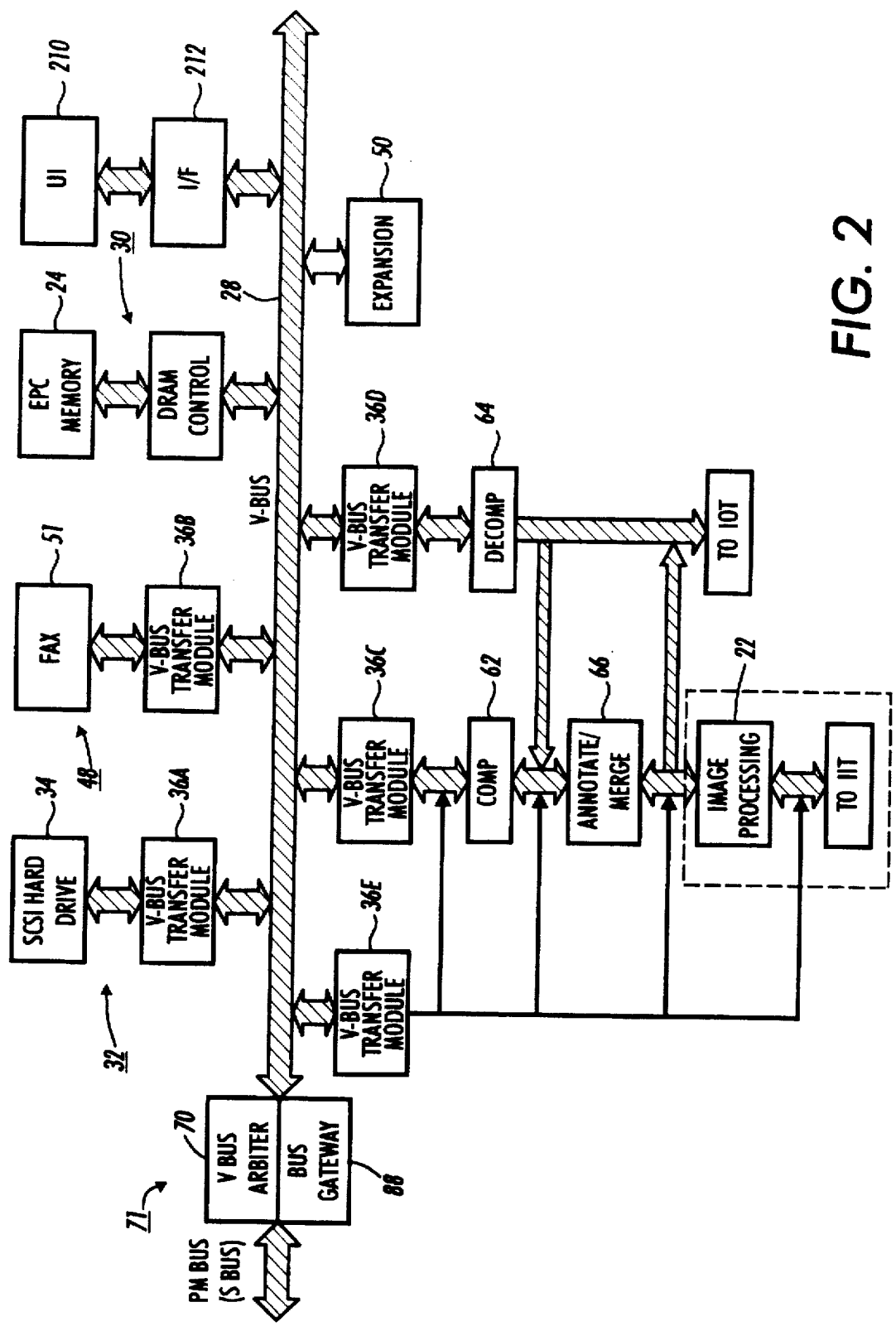
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
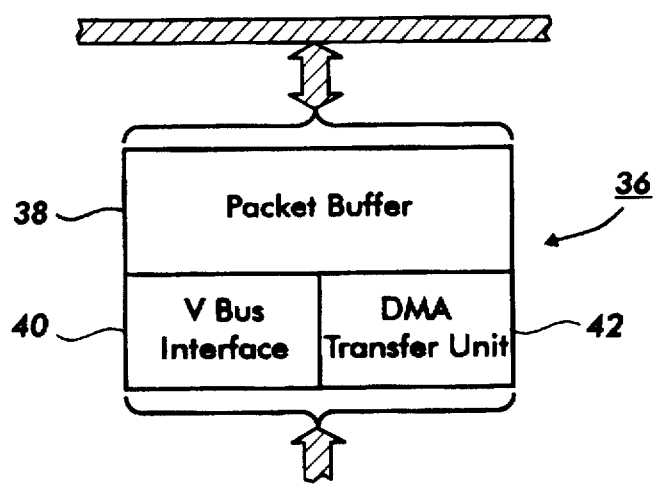
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
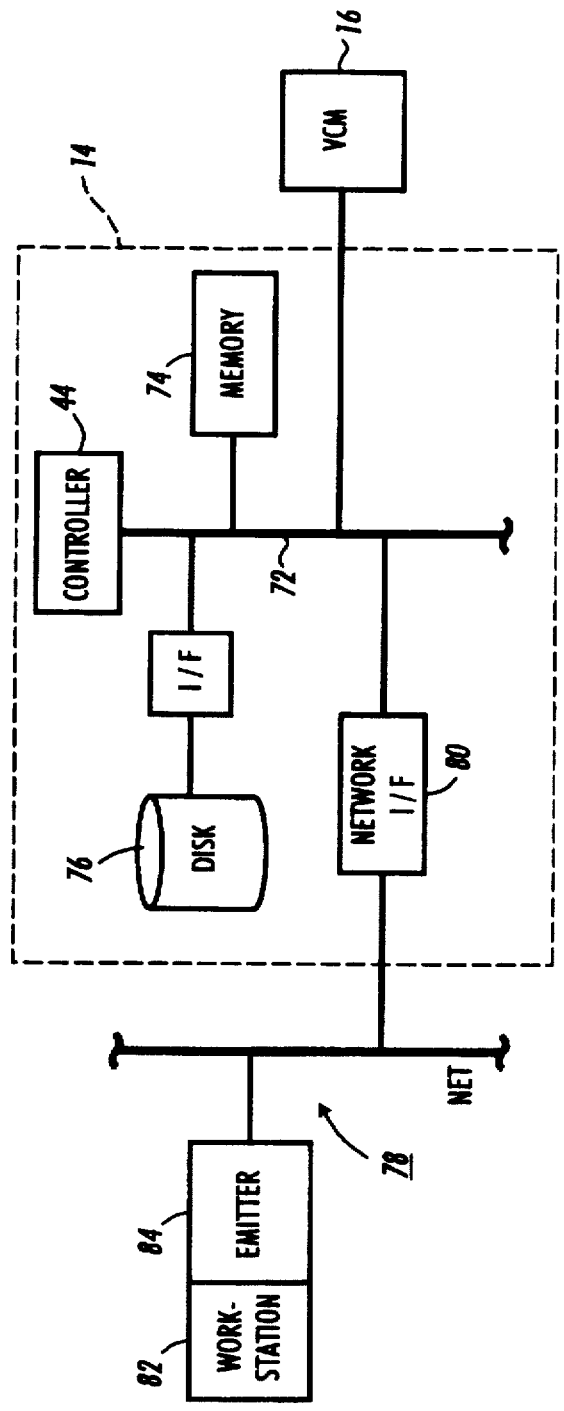
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below More particularly, each image The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
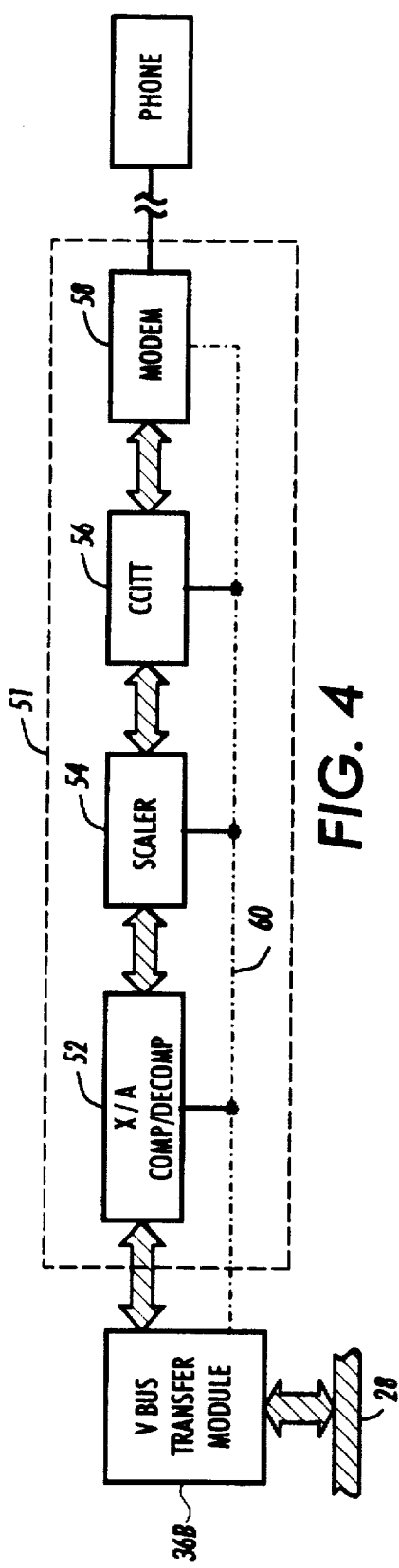
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/ decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual Second Edition Addison-Wesley Publishing Co. 1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
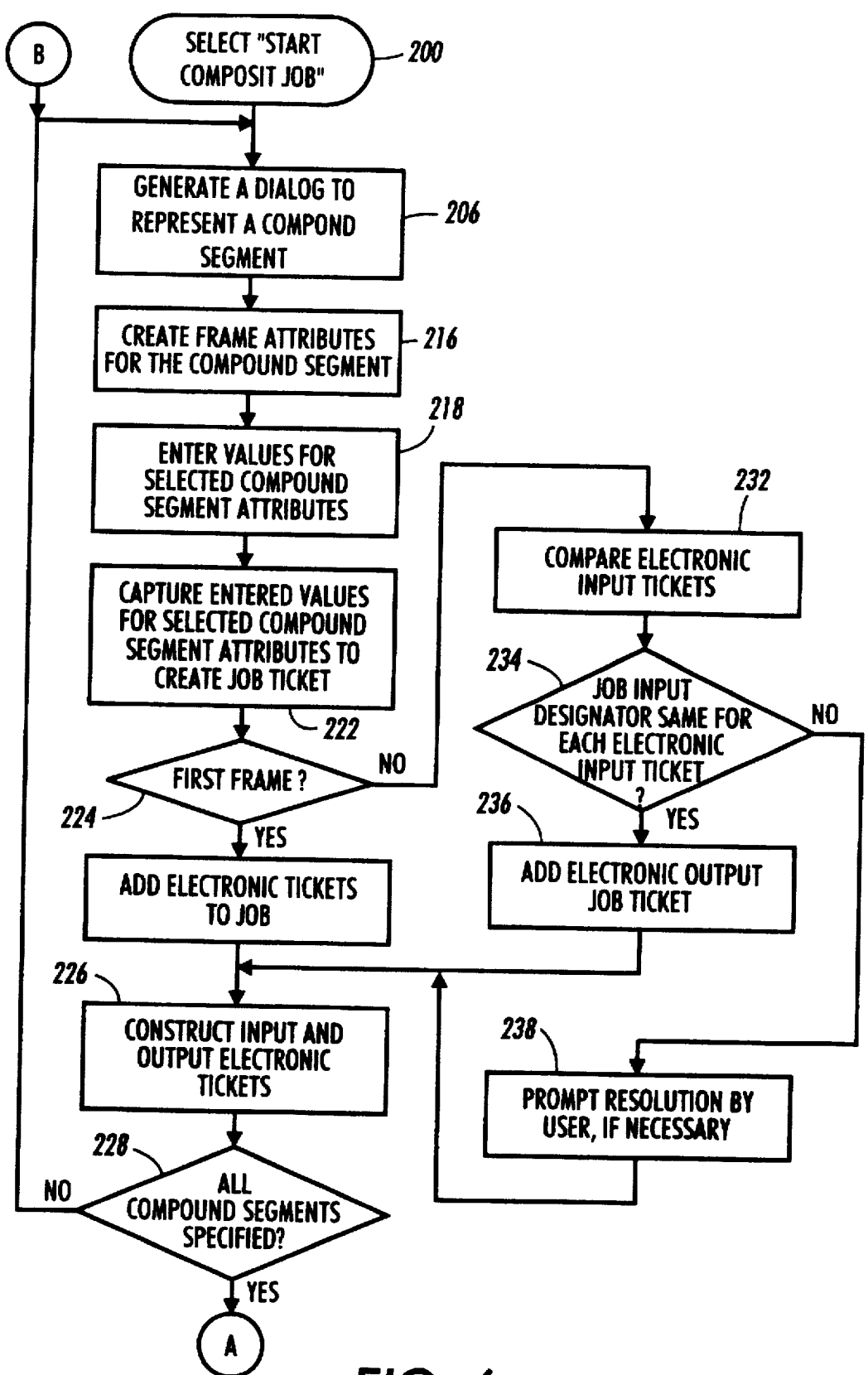
FIG. 6 is a flow diagram illustrating a first embodiment of developing a composite job ticket.
Figure 7:
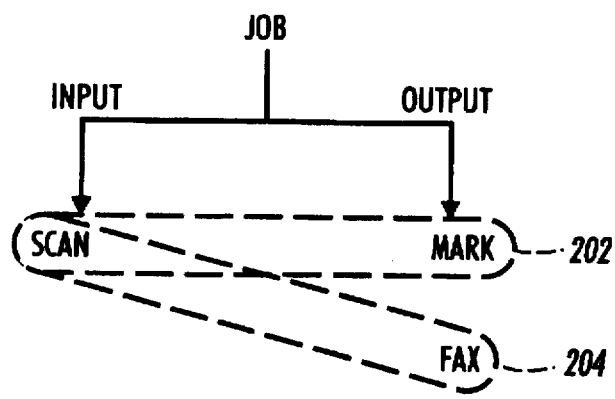
FIG. 7 is a schematic depiction of a job with two compounds.

Referring to FIG. 6, a technique for generating a composite job ticket is discussed. At step 200, the programming of a composite job ticket is initiated. Preferably, the composite job ticket is formed from one or more "compound segments". Referring to FIG. 7, a compound segment is defined, herein, as each pair of input/output designations used to describe the processing of a job. In the illustrated embodiment of FIG. 7, two compound segments, namely compound segment 202 and compound segment 204, are shown. As will be explained in further detail below, the current embodiment contemplates that, for a given job, the input aspect of each compound remains constant.

Figure 8:
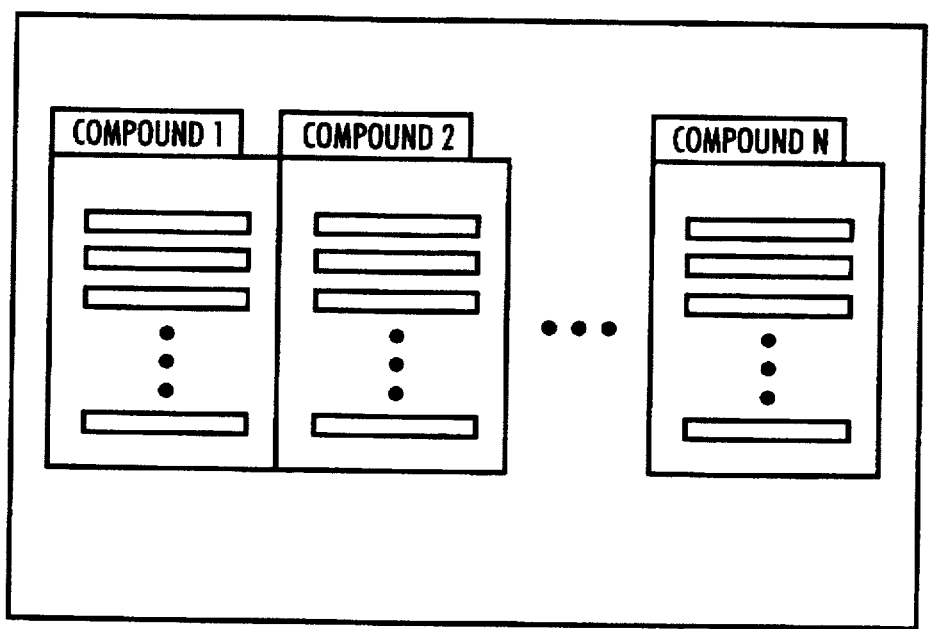
FIG. 8 is a display screen with a plurality of frames respectively configured as compounds, each compound including a plurality of attributes.

Referring again to FIG. 6, at step 206, a dialog, representing a single compound segment, is generated. As will appear, for a preferred composite ticket, multiple compounds will be formed. Referring to FIG. 8, as each compound segment is generated, it will appear on a screen 208, the screen residing on a user interface ("UI") 210 (FIG. 2), the user interface being coupled with the VBus 28 by way of a suitable UI interface 212. Any suitable UI, such as the UI used with the DocuTech® printing system, would be appropriate for use as UI 210. Each compound segment includes one or more frame attributes, each frame attribute being shown in a compound card as a blank rectangle. As is known, a job attribute refers to a job characteristic, such as a stock characteristic (e.g. stock size). The attributes serve as directives for the printing system 10 indicating the manner in which a job copy is inputted and/or outputted.

Referring again to FIG. 6, frame attributes are created for a selected compound segment (step 216) and values for those attributes are, via step 218, entered with the UI 210. In one example, a value would include the degree to which a portion of a job copy is to be edited, e.g. "cropped". Through use of the controller 44 (FIG. 5), the values of the selected compound segment are, via step 220, captured. It will be understood that for each compound segment or frame, two tickets, namely an input ticket and an output ticket, are programmed to provide suitable information to the printing system regarding the input/output attributes of the job. For the first programmed frame (step 222), the electronic input and output job tickets are, at step 224, added to the job and, at step 226, the values are set for the attributes to construct input and output electronic job tickets. If further compound segments are to be specified (step 228), then the process loops back to step 206, otherwise, the process process to a checking routine of FIG. 9. It will be appreciated that each of the electronic tickets are linked or coupled to one another by way of an appropriate referencing scheme, such as a link list. While, in the preferred embodiment, the electronic tickets are maintained in a link list, in other contemplated embodiments parallelism may be facilitated by placing the electronic tickets in an array.

Referring again to step 222, if the frame being programmed is not the first frame, then a conflict check is performed. As will appear, the conflict check insures that only one input is programmed for the job. At step 232, a comparison is performed between the various programmed input tickets of the job. It is then determined, at step 234, whether the job input designator of each programmed input ticket is the same. If the input designators are all the same, then the currently programmed output job ticket is, via step 236, added to the job. On the other hand, in the illustrated embodiment of FIG. 6, if a conflict exists between the input designators, then the process, at step 238, prompts the user to resolve the conflict.

Figure 9:
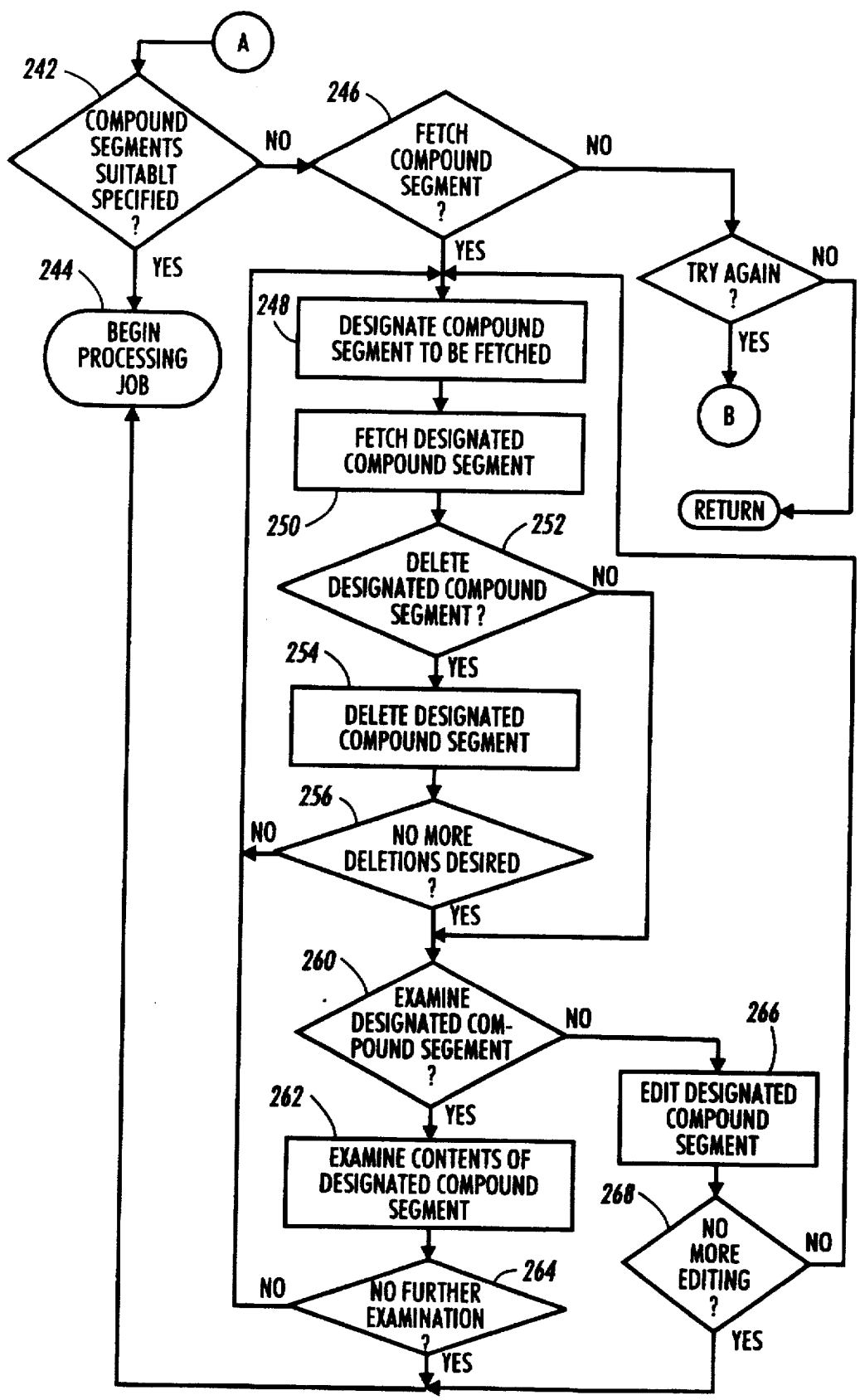
FIGS. 9 is a flow diagram illustrating various functions that can be performed on a programmed composite job ticket.

Referring to FIG. 9, after the composite job ticket has been programmed, by way of the routine of FIG. 6, a user is provided with an opportunity to modify the programmed composite job ticket in various ways. At step 242, a check is performed to determine if the user wishes to make any modifications prior to processing the job. If the compound segments are all suitably specified, from the user's point of view, the job is then processed (step 244). In one example, the job is processed, with the scanner 18 (FIG. 2) and queued in EPC memory 24 for subsequent output to multiple destinations. If the user desires to make further modifications, then the process proceeds to step 246.

At step 246, the user may indicate that a modification (or examination) is desired. In this event a compound segment to be fetched is designated (step 248) and the compound segment is fetched from one of the printing system memory sections (step 250). Once the designated compound segment is fetched, a decision is made, at step 252, as to whether it is to be deleted. If deletion is required, a deletion is performed at step 254 and a check is made, at step 256, as to whether another deletion is desired. If another deletion is desired, then the process loops back to step 248, otherwise the process proceeds to step 260 where a determination regarding examination is made.

If the user desires to examine a designated compound segment, then an examination opportunity is afforded at step 262. If further examination is required (step 264), then the process loops back to step 248 so that another compound segment can be fetched. If the user decides, at step 260, not to examine the fetched compound segment, then the process is routed to step 266 where editing capability is provided. Editing can be achieved with a number of suitable graphics packages. If further editing is required (step 268), then the process loops back to step 248 where another compound segment is fetched.

Figure 10:
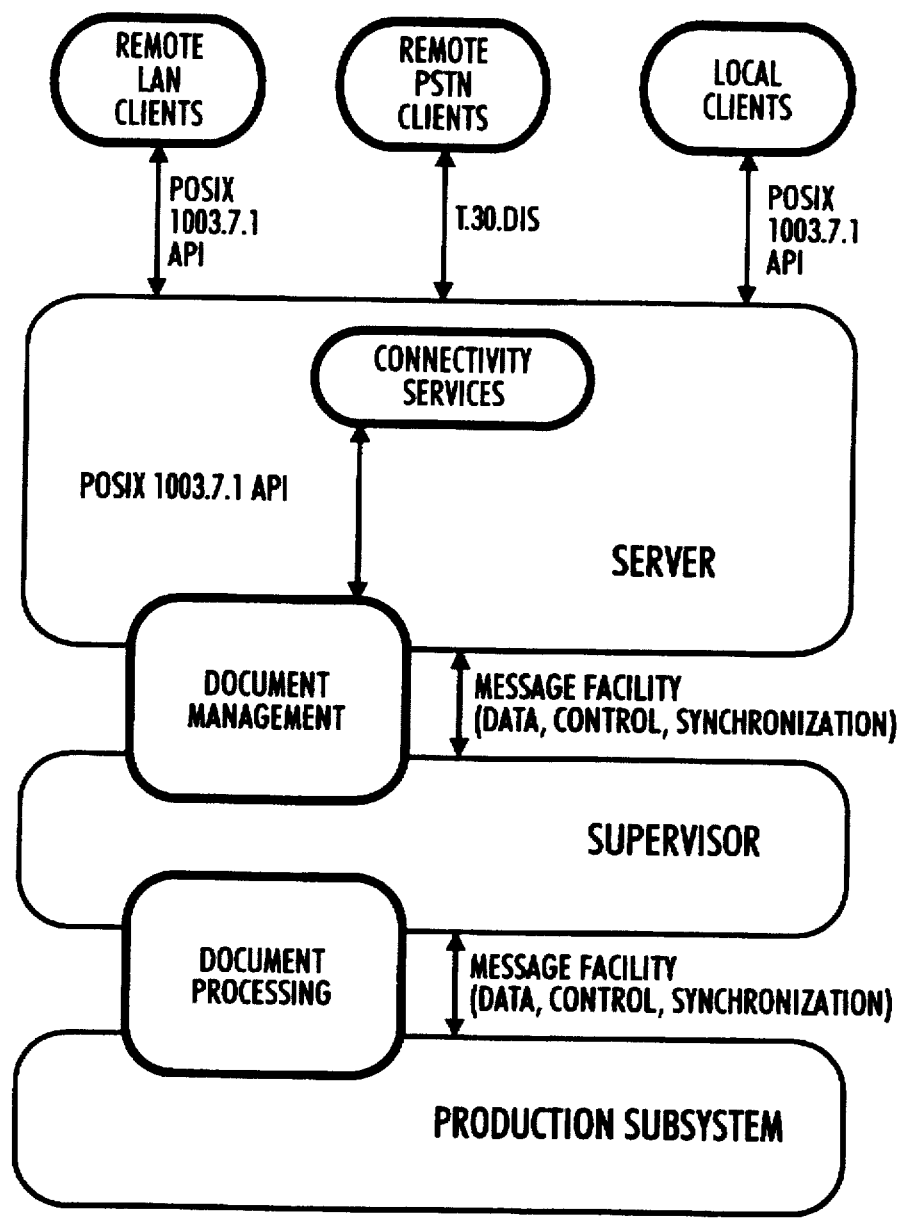
FIG. 10 represents a schematic view of an abstract model of a microkernal suitable for implementing the print server platform of the present invention.

Referring to FIG. 10, an abstract model of a Microkernel mapped into a model, based on DPA ISO 10175/POSIX.7 IEEE 1003.7, is shown. The external interfaces of the Microkernel are fully compliant with the POSIX.7 IEEE 1003.7a standard. The DPA model considers the interface between the Supervisor (or Server) and the Production System to be product dependent.

This model is considered abstract because it demonstrates a mapping, and does not specify architectural detail. This model serves two purposes. First, it helps clarify the relationship of the Microkernel subsystems to a standard. Second, it emphasizes the standardization of the Microkernel application programming interfaces (APIs). The abstract model provides a partitioning of the Microkernel into three major subsystems: Connectivity Services, Document Management, and Document Processing.

In the DPA ISO 10175/POSIX.7 IEEE 1003.7a print system model, the functionality is broken up as follows:

A Print Client

A Print Server

A Print Supervisor

A Print Production System

The DPA/POSIX Print Server handles and processes requests from clients (for example, a user from a workstation). The Server is responsible for validating the requests and adding them to a data base (or queue). The Server contains a scheduler which locates the right printer for the job requirements, and schedules and tracks the job on the printer. The server receives events from the Print Supervisor (which is responsible for driving a printer). The Server reports status and significant events to the user and logs accounting information.

Referring still to FIG. 10, the Microkernel has a Document Management (DM) subsystem that performs most of the DPA/POSIX Server functionality. The DM subsystem validates user requests, queues requests, spools document data, schedules the job for the device, and collects and maintains status information. The DM subsystem extends the DPA/POSIX Server in some aspects, since it can be configured to handle scan jobs (for filing or faxing) and copying jobs. In the Microkernel, significant events such as errors reported by other subsystems (functionally equivalent to the DPA/POSIX model's Supervisor and Production components) are handled by a System Control subsystem.

The DPA/POSIX Print Supervisor is responsible for driving a specific printer and, in one operational mode, prints one job at a time. It is responsible for interpreting the job request, which includes interpreting the contents of the document(s) within a request. The Print Supervisor also reconciles attributes associated with the request and those found during interpretation of the document. Preferably, the Supervisor controls the printing of the job completely. It is responsible for such activities as downloading fonts and transferring data to the printer. The role of the DPA/POSIX Print Supervisor is implemented by the Document Manager and Document Processing subsystems in the Microkernel.

The DPA/POSIX Print Production System is defined to be product specific. In general, the Production System is responsible for processing document or image data and handling typical functions such as marking, collating, and finishing. The Microkernel contains support for production systems which are more capable than traditional printing devices. Processing of documents or image data is implemented by the Document Processing subsystem. Marking, collating, and finishing are not part of the Microkernel. These functions are typically provided by PDT-specific services and applications.

Figure 11:
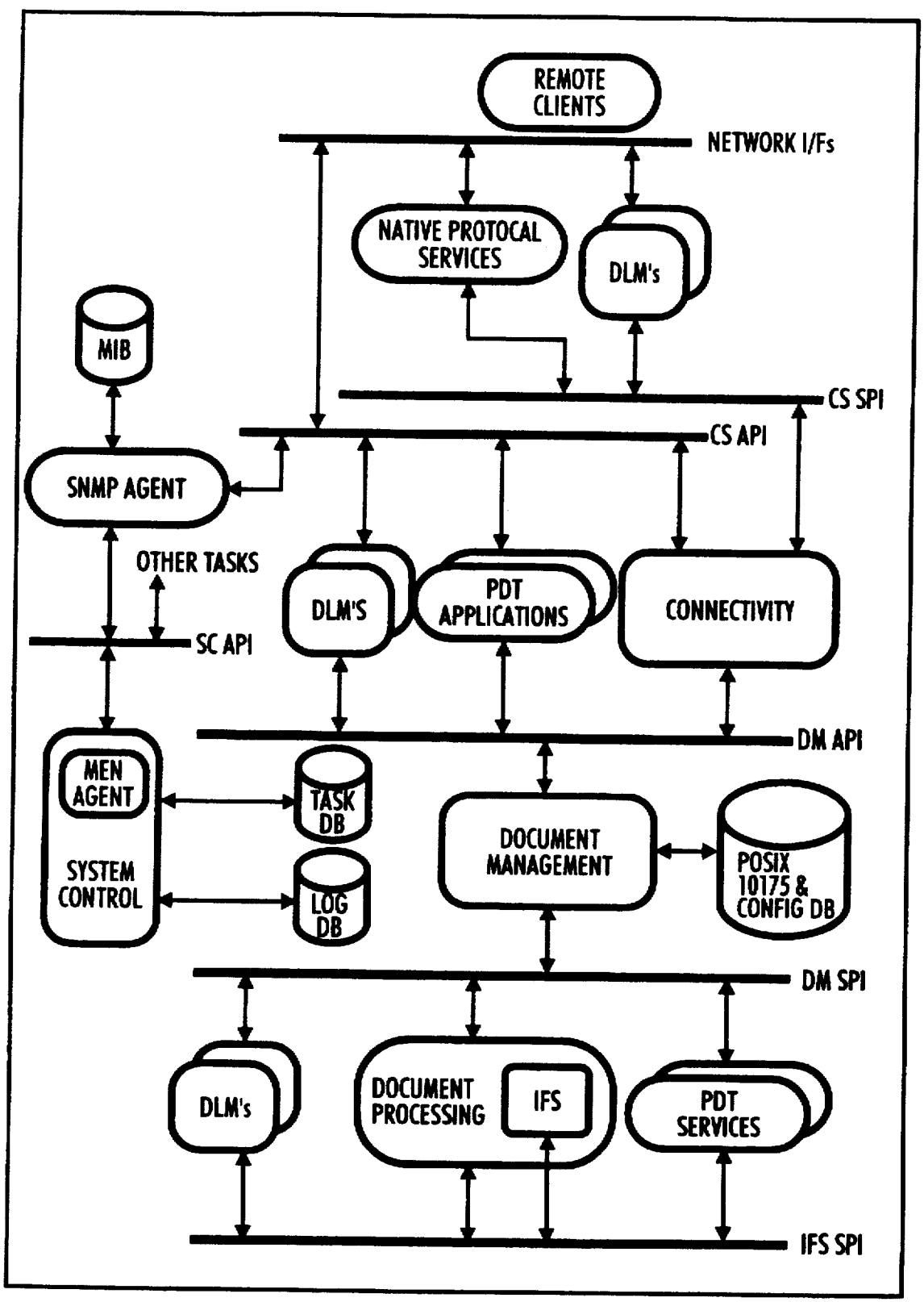
FIG. 11 represents a schematic view of a functional architecture of the microkernal.

Referring to FIG. 11, a functional architecture of the Microkernel is shown. Remote clients interact with the Microkernel-based products via either the native Protocol Services or dynamic loadable modules (DLMs) integrated with the Microkernel. The Protocol Services route requests from remote clients to the Connectivity subsystem in the Microkernel. The connectivity subsystem, as discussed in further detail below, translates the requests from the Protocol services into POSIX commands to the Microkernel server (i.e. the DM).

In general, a network or point-to-point print submission originates at the Protocol Services level of the Connectivity Services (CS) subsystem. Each Protocol Service listens on a well-known socket for a connection indication. When a Protocol Service receives the connection indication it submits a job request to the Connectivity Core. The Connectivity Core will translate this request into a DPA-compatible format and forward it to the DM subsystem. When the job submission is granted, the Protocol Services can submit one or more documents. Document submission is achieved by sending a document request and an I/O descriptor to the Connectivity Core. This will also be translated and forwarded to the DM subsystem.

After the document has been accepted, the Protocol Service starts to receive data from the underlying protocol stack and writes it into the I/O descriptor. This data will read on the other side of the I/O descriptor by a consumer or will be spooled somewhere in the system. When the remote client indicates that there is no more data, the I/O descriptor is closed signaling the end of this specific document. After all documents have been received a job termination request is sent from the Protocol Services to the Connectivity Core, which then forwards it to the DM. Eventually this request will be completed by the system, and the Protocol Service will release all resources associated with the job.

The core of the Microkernel is the DM subsystem which implements the DPA Server functionality. All clients of DM (i.e., the Connectivity Services subsystem, DLMs, and PDT applications) access DPA Services via the Client Request API which conforms to the POSIX 1003.7a standard. The Client Request API hides the implementation details of the Object Data Store, which stores POSIX and other user objects. DM provides for document sniffing, spooling, and scheduling services. Service providers (i.e., Document Processing and PDT Marking applications) can register their services with DM. The DM subsystem schedules the processing of documents to various service providers depending on the processing pipeline and PDL types associated with the job via the service provider interface (SPI). This flexibility enables parallel submission of multiple documents to multiple consumers' pipelines. This capability can enable multiple IOTs to be effectively serviced for achieving high throughput in the system.

Referring still to FIG. 11, Document Processing (DP), which includes the Image Frame Store (IFS) and the instantiation of at least one producer, is provided with the Microkernel. DP processes documents into images (full frame buffers or raster-scan bands, depending on the configuration of the Microkernel). The Image Frame Store assigns producers to consumers. Consumers can be PDT services or DLMs, such as the marking services which control the processing of images provided by DP or any other production-oriented DLM (such as a scanner service).

System Control (SC) is responsible for startup, shutdown, and synchronization of the system. A MEN Agent in the SC subsystem provides the capability for the clients to register for delivery of events and messages, processing event occurrences, and cancelling previous registrations. A SNMP Agent is responsible for remote configuration of the Microkernel by maintaining a MIB Database in the Microkernel and registering interesting events with the MEN Agent on behalf of the SNMP manager. The SNMP Agent provides the mechanism for changing the network configuration information on the Microkernel.

The Microkernel provides a highly extensible framework, along with an important set of core capabilities necessary for implementing a variety of multifunction devices in the office.

Some of the clients and/or service providers are within the Microkernel. They are known as the Native Protocol Services. Others are external, such as the optional DLMs and PDT applications.

A Protocol Service consists of Protocol Modules (PMs) and Protocol Stacks. A Protocol Service is responsible for translating different types of requests from remote hosts into a common format and for relaying these requests to the Microkernel.

The currently disclosed embodiment contemplates support for local access by other Microkernel subsystems, PDT Applications, and DLMs to Fax/Modem facilities, network operations, and to the various topologies and environments supported by the CS subsystem. Limited support for accessing the IPS SNMP/MIB database by providing a simple, light-weight interface to IPS SNMP operations is also contemplated.

Within the Microkernel everything is composed of requests and answers. A job consists of a request upon the system. The Protocol Service interface translates internal PM job-submission commands to POSIX commands. The job submission consists of a Data Store handle (optional) and a job code. After a job is submitted, a response function is called. This is the callback function that the Protocol Services provide. If the job is rejected, the connectivity core releases the handle.

After a job has been accepted, it can be followed by document submission requests. Each document submission request contains a job handle (the previously constructed handle which identifies the job), a document handle, and a blocking file descriptor (read-end of a pipe).

The data for the job is placed into a write-end of the pipe. At the end of a document, the Protocol Services close their connection for this pipe. This signals the end of the document for the read-end of this pipe and for the consumer.

Figure 12:
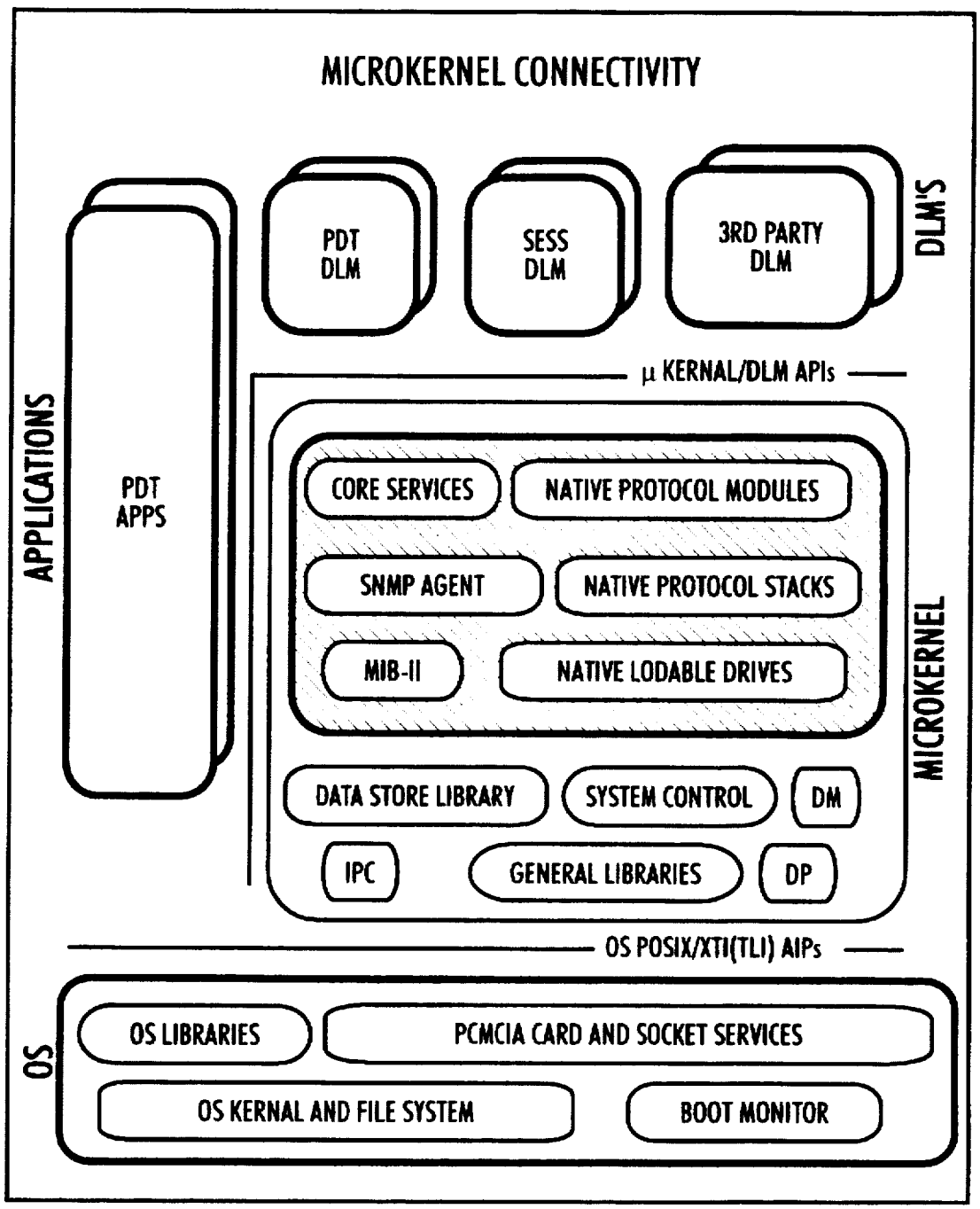
FIG. 12 represents a schematic view of a connectivity subsystem within the context of the microkernal.

Referring to FIG. 12, a CS subsystem, adapted for use with the Microkernel software architecture, is shown. The CS subsystem provides the following services:

Core Services

Native Protocol Services

SNMP Agent V.2 over UDP/IP and IPX

Native Protocol Stacks

MIB-II

Dynamic Loadable Protocol Services

The Core Connectivity Services provide low-level services for handling synchronization and job control (i.e., submitting and accepting jobs). These low-level services are used by the Protocol Services of the CS subsystem. The Core CS also provide initialization, configuration, startup, shutdown, diagnostics, message facilities, and error logging.

The Core CS provide a registration mechanism for the PM and Protocol Stack services, which allows the CS subsystem to be configurable and to support appropriate protocol layering. Core Connectivity is also responsible for registering its configuration and capabilities with System Control.

The Core CS provide the common interface to the SMart Microkernel for the underlying Protocol Modules. Core Connectivity also provides lower-level services and facilities such as a messaging facility, a registration mechanism, and a basic flow-control mechanism.

Protocol Module (PM) services implement printer access protocols, such as, Banyan, AppleTalk PAP, Novell PSERVER, DPA ISO 10175/POSIX.7 IEEE 1003.7a gateway, and UNIX LPR/LPD. In addition to implementing the PM layer, these services are responsible for functions such as high-level flow control, interfacing to the protocol stacks, managing multiple PM sessions, configuration, registration, and diagnostics.

The PM services provide a well-defined API for interaction with the Core CS and Protocol Stack Services. The PM services API allows for the Core CS to interact with the PMs without knowing about the specific PM implementation. This encapsulation and modularity allows the PM services component to be easily extensible. In the simplest configuration, there can only be a single PM service module within the Connectivity Services subsystem.

PMs provide additional functionality such as configuration or filing support, where applicable. The following PMs and corresponding protocol stacks are native to the SMart Microkernel:

Serial XON/XOFF

Parallel IEEE P1284

LPD (rfc1179) over TCP/IP

Novell IPX/SPX PServer version 3.1x

Other PMs and their corresponding protocol stacks implemented as DLMs, are:

AppleTalk

AN Server

Banyan VINES

DPA 10175-compliant gateway

Novell IPX/SPX PServer 4.x

The Protocol Stack services implement the data link-up through the transport, session, or presentation layers defined in the ISO networking model. These protocol stacks include:

Novell IPX/SPX

IPS TCP/IP

IPS UDP/IP

CCITT Fax G3 (provided as a DLM)

AppleTalk (EtherTalk/LocalTalk/TokenTalk) (provided as a DLM)

These Protocol Stack services are responsible for low-level flow control, interfacing to device drivers via standard APIs such as AT&T SVID Data Link Protocol Interface (DLPI), managing multiple sessions within each layer, configuration, startup/shutdown, and diagnostics.

The Protocol Stack services support standard APIs such as STREAMS, DLPI, and XTI (TLI). They are also responsible for supporting authentication and authorization services to the level which they are defined by specific protocol definitions. The Protocol Stack service is configurable and in its simplest form, can only consist of a single stack. Protocol Stacks and Protocol Modules Services can be dynamically added to the system by using DLM conventions.

Figure 13:
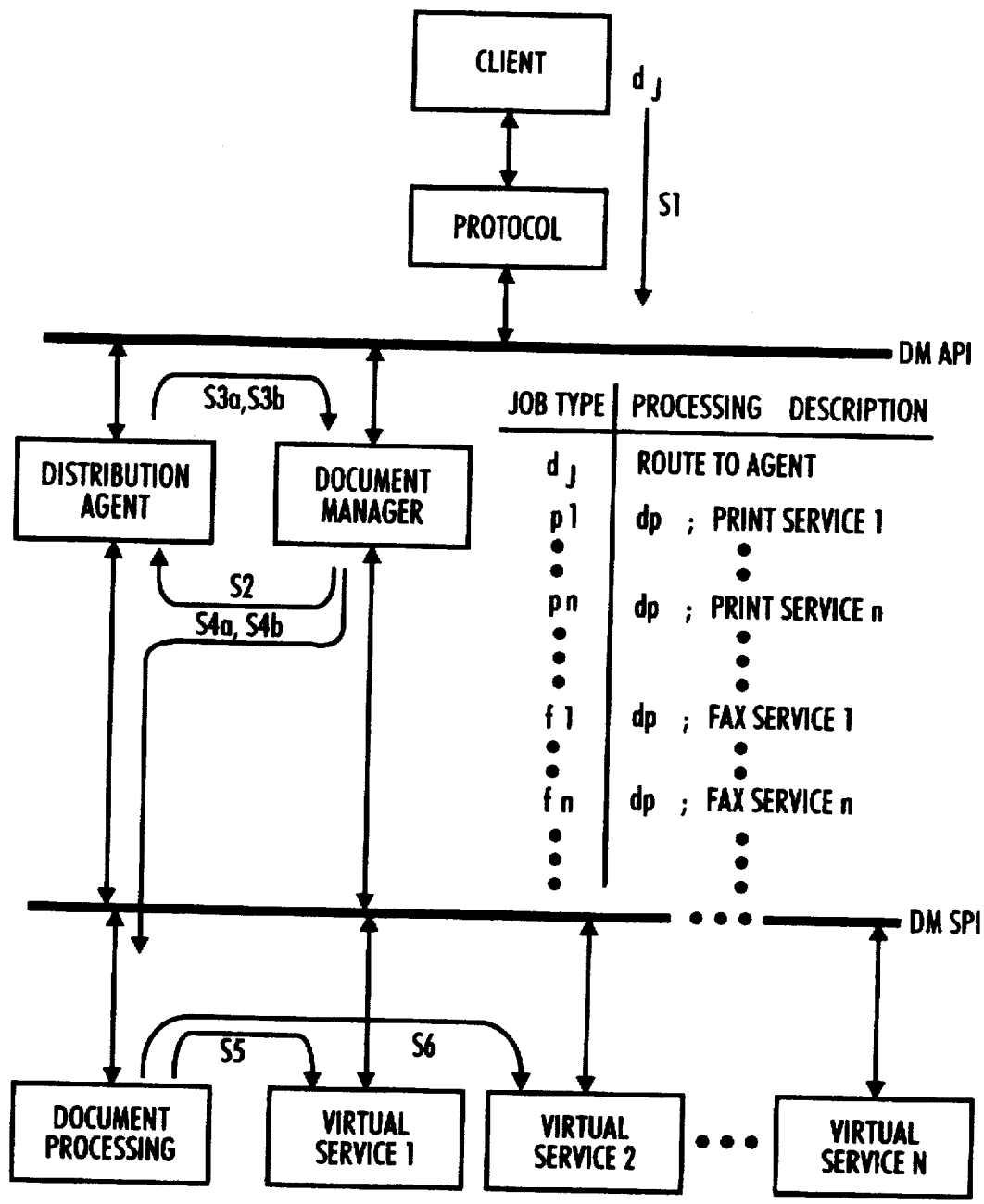
FIG. 13 represents a schematic view of a job distribution subsystem, including a portion of the microkernal functional architecture of FIG. 11 and a distribution agent, in which lines representing the process flow of a distribution job are shown.

Referring to FIG. 13, a system for processing a composite or distribution job is shown. As will be recognized, the illustrated embodiment of FIG. 13 includes various components provided in the architecture of FIG. 11. For ease of discussion, a significant number of the components shown in FIG. 11 have been omitted from the distribution system of FIG. 13, but in actual practice, the distribution system would preferably include most, if not all of, the omitted components. It will be further recognized that the system of FIG. 13 includes a distribution agent ("DA") which functions in parallel with the document manager. As shown in FIG. 13, the DA communicates with the DM by way of interfaces DM API and DM SPI. It will appear that all of the advantages of the DA can be obtained whether it assumes a modular form, relative to the DM, or is actually integrated with the code of the DM.

As further shown in FIG. 13, the PDT services are represented in the form of virtual service 1 ("VS1") through virtual service N ("VSN"). In the example discussed below, VS1 is a print service and VS2 is a fax service. While the virtual services are shown as separate entities, in actual practice two or more virtual services might be implemented on a single platform. For example, in a conventional multifunctional copier, copy, print and fax services are provided by a single platform. Additionally, as will be appreciated by those skilled in the art, each virtual service could be implemented with hardware, software or a combination of the two.

Referring still to FIG. 13, in one mode of operation, an exemplary distribution job ("dj") including a print job and a fax job is developed at the client in the form of a page description language ("pdl") file—the dj further includes a compound ticket with control instructions for processing associated jobs. As will be appreciated by those skilled in the art, the client could assume various forms without affecting the preferred embodiment of the currently described technique. In one example, the client could include a network copier and programming of the dj would be performed with a suitable user interface at the copier Preferably, the processing operation(s) and ultimate destination of each job is preregistered with the DM for storage in the form of a table shown in FIG. 13. In developing the file, the underlying image data for the file as well as job tickets for each of the jobs to be stored/processed are embedded in the pdl file. Additionally, the file or distribution job is identified with a suitable dj identifier in, for example, a header portion of the file.

Preferably, the order in which the jobs are programmed determines the order in which the jobs are distributed in the document processing system of FIG. 13. Pursuant to the execution of step S1, dj is transmitted to the DM by way of a suitable protocol and interface of the types discussed above. At the DM, the job is examined and, upon reading the dj identifier, the DM, by reference to the table, routes the dj to the DA without further processing (S2). As will be appreciated, this automatic routing eases the processing burden of the DM since the DM does not have to parse the information of the dj and take the actions necessary for placing the dj in order for processing with the DP and VSs.

In response to receiving the dj from the DM, the DA provides for the storage of the respective job tickets of the print and fax jobs. Additionally, image data necessary for executing the jobs is stored. As will be appreciated, in one instance, the DA may store the image data and ticket information in the disk 76 (FIG. 5) and maintain references as to the locations at which the image data is stored. In order to execute the distribution job, the DA transmits the jobs in sequence, by way of S3a and S3b, to the DM.

As should be appreciated, the jobs are transmitted in the order in which they were programmed at the client. Moreover, S3a and S3b can be executed at moments in time that are virtually concurrent, or S3b can be executed at a time that is considerably subsequent to S3a. This permits the processing of a second job to be made contingent on the suitable processing of a first job. For example, the first job could be a proof job calling for the printing of a proof set and the second job could call for a plurality of sets to be printed upon approval of the proof set.

By reference to the above-mentioned table of FIG. 13, the DM routes the print job to document processing for interpretation (S4a) and to the VS1 (S5) for printing. Similarly, the fax job is interpreted (S4b) and then transmitted with VS2 to a suitable receiver. It should be appreciated that one of the jobs transmitted to the DM by the DA could be a distribution job so that a job submission would be initiated by one of the VSs. For example, the fax job provided to VS2 could be intended for transmission to a remote VS where the job could be further distributed among selected recipients.

Figure 14A:
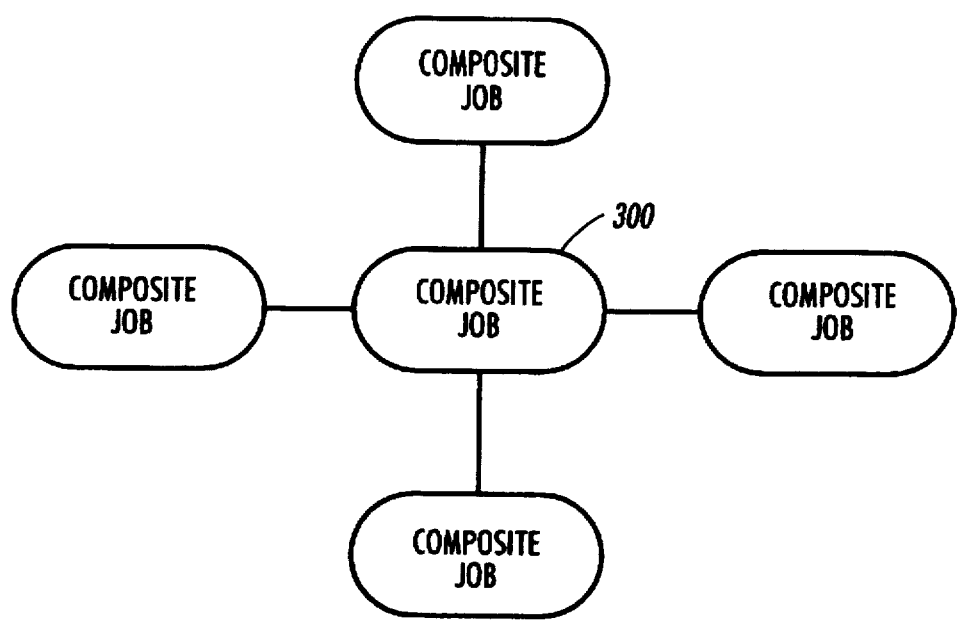
FIG. 14a represents a schematic view of a portion of the job distribution subsystem of FIG. 13 in which a virtual service comprises a job distribution subsystem.
Figure 14B:
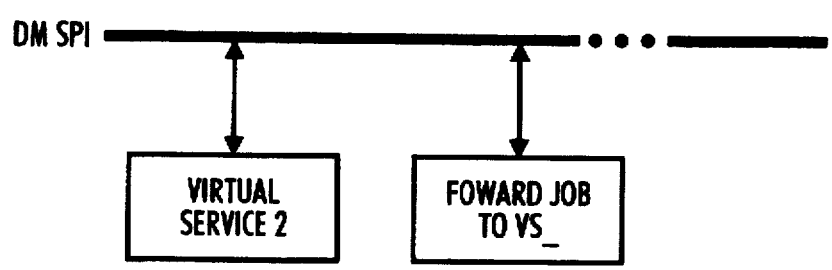
FIG. 14b represents a schematic view of a model for facilitating widespread distribution of the distribution job.
Figure 15:
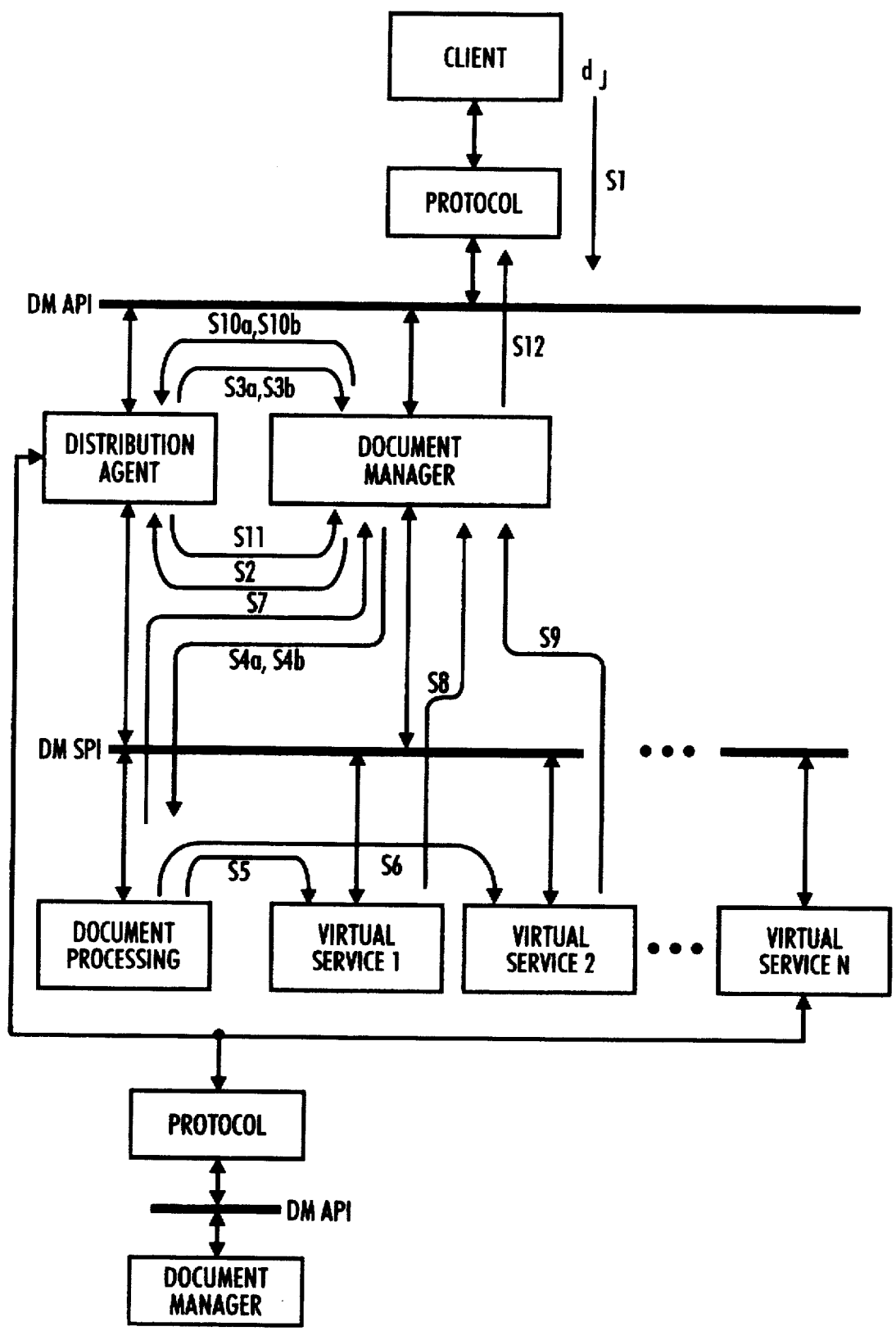
FIG. 15 represents a schematic view of the job distribution subsystem of FIG. 13 in which lines representing the process flow of distribution job modification instructions are shown.

As shown in FIG. 14a, a single distribution job could serve as the basis for the processing of several distribution jobs where the core job 300 serves as the basis for distribution jobs executed at various VSs which may be disposed throughout the United States or the World. Moreover, as shown in FIG. 14b, one of the jobs programmed for the dj could be transmitted to one or more services, other than the ones associated with the DM SPI by simply mapping one of the associated services of the DM SPI with one or more services remote to the associated services. Finally, as illustrated in FIG. 15, the preferred modularlity of the DA permits communication of djs between the the DA and other remote DMs either directly, by way of a second protocol and a second DM API, or indirectly, by way of one of the virtual services.

Referring again to FIG. 13, in an extension of the above-described embodiment, the DA is provided with a database (db) and profiles for various network users of the document processing system of FIG. 11 are provided. Profiles suitable for use in the db are disclosed in U.S. patent application Ser. No. 08/130,934, filed by Harkins et al. on by Oct. 4, 1993—the '934 Application and the present specification are assigned to the same assignee, and the pertinent portions of the '934 Application are incorporated herein by reference. Preferably, each profile would include a list of virtual services available to the network users and the preferred format(s) of each network user.

In one example, the client specifies recipients, in the dj job ticket, by name and, in turn, the DA consults the db to determine the recipients preferred document format(s) and/or preferred transport mechanism(s). The DA then selects a common document format (translatable from the original format) and/or transport mechanism (optimizing cost or time, for example) for delivering associated documents.

Once the information regarding a distribution job is resident at the DA, various operations can, depending on certain conditions, be performed relative to one or more jobs in the distribution job. Among other operations, one or more attributes of the one or more jobs can be cancelled or modified, depending on the extent to which the one or more jobs have been processed. As will appear, to perform cancellation/modification operations on one one or more jobs of the dj it may desirable to pause or halt processing of the one or more jobs. Additionally, the status of one or more of the jobs in the dj can be determined, and one or more of the dj jobs can be promoted ahead of one or more other jobs about to be processed by one or more of the VSs. As will appear, the respective procedures for modifying, cancelling or promoting are quite similar. Thus, only the procedure for modifying attributes of a print job and a fax job will be discussed.

Referring to FIG. 15, the exemplary procedure for modifying the attributes of the print and fax jobs is discussed.

Initially, the client transmits distribution modification instructions ("dj mod") to the document manager (S1) and the document manager routes the dj mod to the DA (S2) for processing thereby. As will be appreciated, the dj mod could comprise one or more instructions with respect to cancelling one or more job attributes or promoting one of the dj jobs ahead of other jobs currently queued up for processing by the VSs. Moreover, the exemplary procedure of FIG. 15 is applicable for performing operation(s) on one job or many jobs in a given dj and need not be performed with respect to all of the jobs in the given dj.

In response to receiving the dj mod, the DA transmits pause instructions (S3a, S3b) for the print and fax jobs to the DM. For the print job, the DM transmits one or more instructions to the DP (S4a) and the VS1 (S5) indicating that processing is to be halted on the print job. In one contemplated example, the DA indicates to the DM one or more attributes of the print job to be modified in the job tickets at VS1. In a similar manner, signals transmitted by way of S4b and S6 are used to halt processing of the fax job. As will appear, halting a job in the middle of processing permits the corresponding job ticket for that job to be altered at either the DA or the associated VS (VS1 in the case of the print job and VS2 in the case of the fax job).

In response to halting processing at the DP, a confirmation signal, at S7, is transmitted back to the DM. Additionally, to confirm that processing of the jobs has been halted or paused, confirmation signals are transmitted from VSs 1 and 2 to the DM at S8 and S9. As will be understood, the current example assumes that attributes of the print and fax jobs can be modified; however, in another example, the signals transmitted from the DP and VSs will indicate that the job(s) cannot be modified due to the extent to which the job(s) has been processed.

Upon receiving confirmation signals from the DP and VSs, the DM informs the DA that job processing has been made to each of the print job (S10a) and the fax job (S10b). In response to such information the DA makes the modifications required in the job tickets for the print job and fax job. To indicate that the modifications have been made to the dj, the DA sends a packet, having the dj identifier, to the DM (S11). Upon detecting the dj identifier, the DM routes the packet to the client (S12) so that the client can readily ascertain that the necessary modification have been made to the respective job tickets of the print job and the fax job.

Numerous features of the above-described embodiment will be appreciated by those skilled in the art. First, a technique is provided for a document server in which the processing of a distribution job is advantageously managed by a distribution agent so that processing of the distribution job can be paused in response to a request by a client to modify or cancel one or more attributes of the distribution job. In particular, the client communicates an attribute alteration request to a distribution agent in such a way that processing of the request by a document manager is minimized. That is, only those jobs requiring alteration are actually brought to the attention of the document manager. In this manner, the document manager, which typically is occupied with performing a significant number of tasks related to jobs other than distribution jobs is relieved of determining which processing activities related to the distribution job need to be paused. Moreover, it is contemplated that attributes can be altered at the distribution agent or in one of the virtual services with which the document manager is associated.

Second, through employment of the distribution agent, the amount of effort expended by the document manger to determine the respective statuses of jobs in the distribution job is minimized. As with the alteration approach, the document manger, whose assistance management is demanded highly by the system as a whole is not burdened with determining which jobs in the distribution job are in need of status information. In particular, the client designates to the distribution agent, in terms of a request, those jobs of the distribution job for which status information is desired. In turn, the distribution agent informs the document manager of such desires so that the document manager does not waste time analyzing the request of the client. Moreover, modularity of the DA, in one embodiment, permits the DA to readily access other DMs.

Finally, through employment of a database at the distribution agent, values for attributes of the distribution job can be set automatically. In one example, the client provides the names of users for whom jobs are intended and the distribution agent automatically determines, by reference to the database, the preferred mode of transportation for one or more jobs (i.e. which virtual service should receive one or more given jobs) and/or the preferred format to be used in processing one or more jobs. Thus the distribution agent provides for a level of intelligence in distribution job programming which heretofore is not believed to have been possible with systems where a server or job manager is burdened with much of the tasks associated with processing the distribution job.

What is claimed is:

1. A document server, including a client, for processing a distribution job in a document processing system, the distribution job including an image data set as well as a first job ticket and a second job ticket, the first and second job tickets including first and second sets of attributes, respectively, each of the first and second attribute sets describing a manner in which first and second copies of the image data set are to be stored in or processed by the document processing system, the document processing system including a first virtual service for storing or processing the first copy of the image data set in accordance with the first attribute set and a second virtual service for storing or processing the second copy of the image data set in accordance with the second attribute set, comprising:

a document manager, communicating with the first and second virtual services, for coordinating the storing or processing of the first and second job copies in the first and second virtual services;

a distribution agent, communicating with said document manager, for receiving the first and second job tickets of the distribution job as a single package, said distribution agent transmitting a copy of the first job ticket of the single package to said document manager so that said document manager facilitates routing of both the first copy of the image data set and the copy of the first job ticket to the first virtual service, and said distribution agent transmitting a copy of the second job ticket of the single package to said document manager so that said document manager facilitates routing of both the second copy of the image data set and the copy of the second job ticket to the second virtual service; and said distribution agent receiving a distribution job alteration request after the copies of the first and second job tickets have been transmitted to said document manager, the distribution job alteration request including information indicating an alteration to be made in one or more of the attributes of each of the first and second attribute sets, said distribution agent, in response to receiving the distribution job alteration request, transmitting a task halting request to said document manager, said document manager, in response to receiving the task halting signal, causing any ongoing activities, relative to the first and second copies of the image data set, to be halted.

2. The document server of claim 1, in which the task halting request includes a first halt command signal directing said document manger to cause any processing of the first copy of the image data set to be halted at the first virtual service and a second halt command signal directing said document manger to cause any processing of the second copy of the image data set to be halted at the second virtual service.

3. The document server of claim 2, wherein said distribution agent transmits the first and second halt command signals to said document manager in series.

4. The document server of claim 2, in which each of the first and second copies of the image data set are transmitted to an image data set interpretation service prior to being transmitted to the first and second virtual services, wherein said document manager causes any current interpretation of the first copy of the image data set to be halted in response to receiving the first halt command and any current interpretation of the second copy of the image data set to be halted in response to receiving the second halt command.

5. The document server of claim 1, in which the single package is provided with an identifier, wherein the single package is transmitted from the client to said document manager for reading thereof, wherein, when said document manager reads the identifier, said document manager routes the single package to said distribution agent without further processing of the distribution job.

6. The document server of claim 1, wherein said document manager causes one or both of the first and second job tickets to be altered, in accordance with the distribution job alteration request, at one or both of the first and second virtual services.

7. The document server of claim 1, wherein:
said document manager causes any processing of the first and second copies of the image data set to be halted at the first and second virtual services;
in response to said halting, said document manager transmits a confirmation to said distribution agent indicating that the storing of or processing of the first and second copies of the image data set has been halted; and
in response to receiving the confirmation, said distribution agent alters one or more attributes in each of the first and second attribute sets.

8. The document server of claim 1, wherein the alteration of one or more attributes by said distribution agent includes modifying one or more attributes in each of the first and second attribute sets.

9. The document server of claim 1, wherein the alteration of one or more attributes by said distribution agent includes cancelling one or more attributes from each of the first and second attribute sets.

10. The document server of claim 1, wherein each of said first and second virtual services, said document manager and said distribution agent all communicate with one another by way of a first interface.

11. The document server of claim 10, wherein each of the client, said distribution agent and said document manager communicate with one another by way of a second interface.

12. A document server, including a client, for processing a distribution job in a document processing system, the distribution job including an image data set as well as a first job ticket and a second job ticket, the first and second job tickets including first and second sets of attributes, respectively, each of the first and second attribute sets describing a manner in which first and second copies of the image data set are to be stored in or processed by the document processing system, the document processing system including a first virtual service for storing or processing a first copy of the image data set in accordance with the first attribute set and a second virtual service for storing or processing a second copy of the image data set in accordance with the second attribute set, comprising:

a document manager, communicating with the first and second virtual services, for coordinating the storing or processing of the first and second copies of the image data set in the first and second virtual services;

a distribution agent, communicating with said document manager, for receiving the first and second job tickets of the distribution job as a single package, said distribution agent transmitting a copy of the first job ticket of the single package to said document manager so that said document manager facilitates routing of both the first copy of the image data set and the copy of the first job ticket to the first virtual service, and said distribution agent transmitting a copy of the second job ticket of the single package to said document manager so that said document manager facilitates routing of both the second copy of the image data set and the copy of the second job ticket to the second virtual service; and said distribution agent receiving a first distribution job status request after the copies of the first and second job tickets have been transmitted to said document manager, said distribution agent transmitting a second distribution job status request, to said document manager, for directing said document manager to determine an extent to which each of the first copy of the image data set and the second copy of the image data set has been processed by the document server, said document manager, in response to receiving the second distribution job status request, causing the extent to which each of the first copy of the image data set and the second copy of the image data set has been processed by the document server to be determined.

13. The document server of claim 12, wherein the distribution job status request includes a first job status request signal directing said document manger to obtain a first determination as to an extent to which the first copy of the image data set has been processed by the first virtual service and a second job status request signal directing said document manger to obtain a second determination as to an extent to which the second copy of the image data set has been processed by the second virtual service.

14. The document server of claim 13, wherein said distribution agent transmits the first and second job status request signals to said document manager in series.

15. The document server of claim 13, in which said document manager receives a status indication, from the first and second virtual services, indicating the extent to which the first copy of the image data set has been processed at the first service and the extent to which the second copy of the image data set has been processed at the second service, wherein said distribution agent and said document manager, by reference to the status indication, function cooperatively to inform the client of the status of the first copy of the image data set and the second copy of the image data set.

16. The document server of claim 12, in which the single package is provided with an identifier, wherein the single package is transmitted from the client to said document manager for reading thereof, wherein, when said document manager reads the identifier, said document manager routes the single package to said distribution agent without further processing of the distribution job.

17. The document server of claim 12, in which the first and second copies of the image data set are transmitted to an image data interpretation service prior to being transmitted to the first and second virtual services, wherein said document manager, in response to receiving the second distribution job status request, obtains a determination as to an extent to which the first copy of the image data set has been processed by the image data interpretation service and a determination as to an extent to which the second copy of the image data set has been processed by the image data interpretation service.

18. The document server of claim 12, wherein each of the first and second virtual services, said document manager and said distribution agent all communicate with one another by way of a first interface.

19. The document server of claim 18, wherein each of the client, said distribution agent and said document manager communicate with one another by way of a second interface.

* * * * *